United States Patent [19]

Reardon et al.

[11] 3,896,065

[45] July 22, 1975

[54] SUBSTRATES COATED WITH STABLE PIGMENTED ETHYLENE COPOLYMER DISPERSIONS

[75] Inventors: Joseph Edward Reardon; Vernon Clare Wolff, Jr., both of Wilmington, Del.

[73] Assignee: E. I. du Pont de Nemours and Company, Wilmington, Del.

[22] Filed: Nov. 20, 1970

[21] Appl. No.: 91,568

Related U.S. Application Data

[63] Continuation-in-part of Ser. No. 757,096, Sept. 3, 1968, abandoned.

[52] U.S. Cl. ............... 260/28.5 AV; 117/155 UA; 260/29.6 R
[51] Int. Cl. ............................................. C08f 45/52
[58] Field of Search .. 260/28.5 AV, 29.6 R, 29.7 R, 260/28.5 AV; 117/155 UA

[56] References Cited
UNITED STATES PATENTS

| | | |
|---|---|---|
| 3,189,573 | 6/1965 | Oken .......................... 260/28.5 AV |
| 3,215,657 | 11/1965 | Beresniewicz .............. 260/28.5 AV |
| 3,296,172 | 1/1967 | Funck ................................ 260/29.6 |
| 3,321,426 | 5/1967 | Dorsey ......................... 260/41 B X |
| 3,355,405 | 11/1967 | Tyran .......................... 260/28.5 AV |
| 3,487,036 | 12/1969 | Bissot ............................ 260/29.6 R |
| 3,578,618 | 5/1971 | Beardsley ..................... 260/29.6 R |
| 3,716,504 | 2/1973 | Linderman .................. 117/155 UA |

*Primary Examiner*—Theodore Morris

[57] ABSTRACT

Stable pigmented ethylene copolymer dispersions and cellulosic substrates coated therewith are provided. The dispersions enable pigmented, moisture-barrier single-pass coatings to be applied "in line" which possess good brightness and moisture-barrier properties. The dispersion comprises 20 to 80% by weight of at least one pigment and 80 to 20% by weight of a polymeric pigment binder which comprises 25 to 100% of at least one copolymer of ethylene and another polar monomer and 0 to 75% of a polymeric coalescing aid. Viscosity modifiers and antifoams can be added.

2 Claims, No Drawings

SUBSTRATES COATED WITH STABLE PIGMENTED ETHYLENE COPOLYMER DISPERSIONS

CROSS REFERENCE TO RELATED APPLICATIONS

This application is a continuation-in-part of pending application Ser. No. 757,096, now abandoned filed Sept. 3, 1968.

BACKGROUND OF THE INVENTION

1. Field of Invention

This invention relates to pigmented ethylene copolymer dispersions and substrates coated therewith, and more particularly to such dispersions which give a single-pass coating on newsback board, possessing good brightness and moisture-barrier properties.

2. Prior Art

The majority of the board presently used in the packaging of detergents, frozen foods, etc., is coated with a standard clay coating. This coating provides printability but does not possess any measurable barrier to moisture vapor. Other techniques employed to provide moderate moisture-barrier properties to newsback board have been the following types of applied coatings — (a) extrusion coatings, (b) hot melts, (c) wax and wax blends, (d) outside wax laminated, (e) asphalt laminated, and (f) pattern applied PVDC—polyvinylidene chloride. The extrusion, hot melt, wax, wax blends, and PVDC pattern applied coatings cannot be pigmented to give the required brightness. To obtain brightness, a pigmented undercoating is required. This method requires an additional, inefficient and costly off-machine operation. Both the outside wax-laminated and asphalt-laminated board are very expensive constructions.

It is taught in U.S. Pat. No. 3,321,426 issued to W. S. Dorsey on May 23, 1967, that wax-containing compositions in the form of discrete free-flowing pellets can be prepared by agitating a wax or wax composition in the molten state within a body of a non-solvent liquid which contains a finely-divided solid. In carrying out the process, it is essential that emulsification or stable dispersion be avoided. There is no suggestion of applying the preparatory mixture to a substrate as a coating.

SUMMARY OF THE INVENTION

According to the present invention there is provided a coated article comprising: a cellulosic substrate and a pigmented, moisture-barrier coating on at least one surface thereof comprising about 20 to 80% by weight of at least one pigment and about 80 to 20% by weight of a polymeric pigment binder comprising 25 to 100% by weight, based on the total weight of polymeric binder, of an ethylene copolymer of about 30 to 97% by weight of copolymerized ethylene and about 3 to 70% by weight of at least one copolymerized polar monomer and 0 to about 75% by weight, based on the total weight of polymeric binder, of a polymeric coalescing aid selected from the group consisting of a hydrocarbon wax and a synthetic soft polymer.

There is also provided a stable aqueous dispersion suitable for applying as a coating comprising: about 20 to 80% by weight, based on the weight of solids, of at least one pigment; about 80 to 20% by weight, based on the weight of solids, of a polymeric pigment binder comprising 25 to 100% by weight, based on the total weight of polymeric binder, of at least one ethylene copolymer of about 30 to 97% by weight of copolymerized ethylene and about 3 to 70% by weight of at least one copolymerized polar monomer and 0 to about 75% by weight, based on the total weight of polymeric binder, of a polymeric coalescing aid selected from the group consisting of a hydrocarbon wax and a synthetic soft polymer; said dispersion having a solids content of about 30 to 65% by weight.

The present invention provides a single-pass pigmented coating possessing a moisture vapor barrier under 10 gm./24 hrs./100 sq. in., preferably equal to or less than 4 gm./24 hrs./100 sq. in., when measured by either the TAPPI Test T464 M-45 or by the Honeywell Water Vapor Transmission Tester and a brightness ranging between 30 and 80 measured by a G.E. brightness meter using TAPPI procedure T452 M-58. Brightness depends upon the amount and kind of pigment. The coating should also possess a good aesthetic appearance as well as being gluable and printable by conventional methods and can be applied on machine as the cylinder board is being prepared.

DETAILED DESCRIPTION OF THE INVENTION

The polymers which are operable in the practice of this invention comprise about 30 to 97% by weight of copolymerized ethylene and about 3 to 70% by weight of at least one comonomer having polar characteristics, such as vinyl alkanoates of 2 to 8 carbon atoms in the acid portion like vinyl acetate, vinyl propionate, vinyl butyrate, vinyl 2-ethyl hexoate or suitable mixtures thereof, alpha,beta-ethylenically unsaturated carboxylic acids like acrylic or methacrylic, acrylate or methacrylate esters like methyl methacrylate or ethyl acrylate, vinyl chloride and vinyl alcohol (i.e., hydrolyzed vinyl acetate). Copolymers of ethylene and vinyl acetate are particularly suitable for this invention. Preferably, such ethylene/vinyl acetate copolymers contain about 55 to 82% by weight of copolymerized ethylene and about 45 to 18% by weight of copolymerized vinyl acetate. Terpolymers of ethylene containing copolymerized vinyl acetate and copolymerized acrylic acid or methacrylic acid wherein the acid content is from 0.5 to 10% by weight, and the combined vinyl acetate and acid content is from 18 to 40% by weight are also suitable copolymers. The copolymers used in this invention are generally prepared by high-pressure free-radical catalysis processes, but copolymers prepared by low-pressure coordination catalysis processes are also suitable. Exemplary patents illustrating copolymer preparation are U.S. Pat. No. 2,703,794 issued to Milton J. Roedel on Mar. 8, 1955, and U.S. Pat. No. 3,215,657 issued to Aleksander Beresniewicz on Nov. 2, 1965. The molecular weight of useful copolymers can be varied over a wide range. However, the copolymers preferably have molecular weights corresponding to a melt index of from 3 to 150. The copolymer melt index is determined as described in ASTM-D-1238-65 T using condition E for those copolymers having a melt index below about 75, and using condition A for those copolymers having a melt index in excess of 75.

Other preferred polymers are the ethylene/alpha, beta-ethylenically unsaturated carboxylic acid copolymers of from about 55 to 97% by weight ethylene and about 3 to 45% by weight of an alpha,beta-ethylenically unsaturated carboxylic acid such as acrylic acid, methacrylic acid, fumaric acid, maleic acid, itaconic acid, aconitic acid, and the like. Acid derivatives of the aforesaid, such as esters, amides, anhydrides, and the like, also may be employed as monomers. While these derivatives must be convertible to a free carboxylic acid group prior to the formation of the dispersion, it is not necessary that all such derivatives be converted to free carboxyl groups. Such a copolymer has about 5 to 75% of the acid groups neutralized with sodium hydroxide as described in U.S. Pat. No. 3,296,172 issued to D. L. Funck and V. C. Wolff, Jr. on Jan. 3, 1967. The preferred acid monomer is methacrylic acid.

Dispersions of the preferred copolymers can be prepared as described in U.S. Pat. No. 3,296,172 or as in copending application Ser. No. 642,168 filed by Thomas C. Bissot on May 29, 1967.

In the preparation of the dispersions, any of the conventional mineral pigments or mixtures of pigments can be employed, the nature and amount of each pigment being primarily dependent upon the use intended for the dispersion and the properties desired. Generally, the solids content of the dispersion will comprise 20 to 80% by weight of pigment; however, best over-all pigmentation and barrier properties are attained when the pigment comprises about 50% by weight.

The common pigments are the various grades of clay, including swelling and non-swelling clay and commercially available coating clay, calcium carbonate, titanium dioxide, talc, satin white, lithopone, finely divided metals such as aluminum and color lakes in tinctorial oxides. While coating clay and titanium dioxide are preferred, various levels of gloss can be attained by varying the amount of clay in a mixture of the two pigments. The greater the amount of titanium dioxide, the greater the brightness of the coating. The pigment can be added to the polymer dispersion as a predispersion (about 70% solids) or it can be dispersed directly into the polymeric dispersion.

The optional polymeric coalescing aids useful in the present invention are waxes and synthetic soft polymer latices, usually commercially available, which when blended with the pigmented polymeric dispersion and then formed into a coating, aid in coalescing the coating at low temperatures into a smooth coating free of pinholes. These coalescing aids are soft polymers and should not be confused with particular chemical plasticizers. Typical synthetic soft polymeric dispersion coalescing aids are the soft polymers of vinylidene chloride polymers, vinyl chloride polymers, styrene-butadiene polymers higher in butadiene content, acrylonitrile-butadiene-styrene polymers, soft acrylic polymers and alpha-olefin polymers. These polymers include copolymers (terpolymers) as well as homopolymers and are all well known and documented in the literature. Typically, they have a low modulus, a low yield stress, and a moderate-to-high elongation at break as described in *Textbook of Polymer Science*, F. W. Billmeyer, Jr., Interscience Publishers, N.Y., pp. 109–110 and *Mechanical Properties of Polymers*, L. E. Nielsen, Reinhold Publishing Corp., N.Y., pp. 101–102.

The preferred polymeric coalescing aids are hydrocarbon waxes which can be codispersed with the ethylene copolymer dispersion or a wax dispersion which can be blended with the ethylene copolymer dispersion. The waxes can be of either animal, vegetable or mineral origin. Waxes which are preferred are the petroleum waxes of natural origin and include both paraffin and microcrystalline waxes. These waxes are mixtures of solid hydrocarbon derived through the fractional distillation of petroleum. After purification, they contain hydrocarbons that fall within the formula range of $C_{23}H_{48}$–$C_{35}H_{72}$. The waxes are hard, colorless and translucent materials having melting points generally in the range of from about 120° to 200°F., preferably 120° to 180°F. Paraffin waxes are generally preferred over microcrystalline waxes for the present invention because they provide better moistureproofing and are generally of better color. The wax coalescing aid is, of course, not limited to the wax of petroleum since waxes having similar properties which are of natural origin, e.g., beeswax and carnauba wax, as well as low molecular weight polyethylene wax (mol. wt. of 2,000–6000) can be used alone or in combination with petroleum waxes or the other polymeric coalescing aids.

The polymeric coalescing aid is used in the dispersion at a level of from 0 to about 75% by weight. The dispersion does not need to contain polymeric coalescing aid when the coated substrate is dried at a temperature high enough to coalesce the coating free of pinholes. Volatile materials such as butyl cellosolve can also be used to aid in coalescing the coating; however, such materials should not be used due to their odors, possible toxicity, disposal problems and air pollution problems.

When necessary or desirable, other additives such as viscosity modifiers and antifoams can be added to the dispersion. Typical viscosity modifiers are polyvinyl alcohol, carboxymethyl cellulose, methyl cellulose and polyacrylamide. It may in some instances be more desirable to control the pigmented coating thickness by increasing the viscosity of dispersion than by increasing the air flow to the air knife usually used with commercial coaters. Whatever the manner used for controlling coating thickness, the pigmented coating will be applied between about 12 and 20 lbs./3,000 ft.$^2$, and then dried in the usual manner to coalesce the coating to a continuous film.

Any cellulosic substrate can be coated with the pigmented dispersion; however, particularly preferred substrates are pigmented or unpigmented, bleached or unbleached cylinder newsback board which can be both sized and unsized. Cylinder board coated with the present pigmented moisture-barrier coating finds markets such as detergent cartons or institutional frozen food packages.

The pigmented coating applied from the present dispersion has a number of advantages. Combining moisture-barrier properties with pigmentation in a single coating enables coatings of varying properties to be applied "in line" on commercial equipment. At one end of the spectrum are end uses requiring high hiding but less stringent moisture barrier. At the other end there are end uses which require very low moisture barrier with only moderate hiding power. A good combination of both properties is attained with about 50% pigment and about 50% polymer.

The invention can be further understood by the following examples where parts and percentages are by weight unless otherwise indicated.

EXAMPLE 1

With gentle agitation, 20 gm. of 55.3% solids dispersion of "Aristowax" 143/150 (a paraffin wax, m.p. 143° to 150°F.), 15.5 gm. of a 70% solids dispersion of "Ultrawhite" 90 clay, 46.5 gm. of a 70% solids dispersion of titanium dioxide, and 20.0 gm. of a 4% aqueous solution of polyvinyl alcohol (99% hydrolyzed) were added to 80 gm. of a dispersion of an ethylene/methacrylic acid (89/11%) copolymer, 30% neutralized with sodium hydroxide having a solids content of 42%. The resulting dispersion contained 50% solids of 49% pigment and 51% polymer and wax. The pigment comprised 75% $TiO_2$ and 25% clay, and the binder comprised 75% polymer and 25% wax. The dispersion was applied by means of a No. 24 wire-wound bar to polyvinyl alcohol-sized cylinder board at a coating weight of 15 to 20 lbs./3,000 ft.[2]. When dried at 150° C. for 20 seconds in a forced air oven, this mixture coalesced to give a coating with a Honeywell MVTR of 5.4 gm./24 hrs./100 sq. in. at 100°F., 90% R.H., and a G.E. brightness of 83.0 using TAPPI T452 M-58.

The same results were obtained using carboxymethyl cellulose and a 2% aqueous solution of a methylcellulose solution ("Methocel" 65 HG-DG 4000).

EXAMPLE 2

Example 1 was repeated except the polyvinyl alcohol thickener was eliminated. To coalesce the film, the coating was dried at 190°C. for 20 seconds. The resulting coating had a G.E. brightness of 83 and a Honeywell MVTR of 3.8 gm./24 hrs./100 sq. in.

EXAMPLE 3

Example 1 was repeated except a 50% solids dispersion of 85% "Aristowax" 143/150 and 15% of an ethylene/vinyl acetate copolymer (28% vinyl acetate) was substituted for the wax dispersion. The resulting dispersion contained 54% solids comprising about 50% pigment (75% $TiO_2$ and 25% clay) and about 50% binder (75% partially neutralized ethylene/methacrylic acid copolymer, 21% "Aristowax" 143/150 and 4% ethylene/vinyl acetate copolymer). This composition gave a coating on cylinder board with a Honeywell MVTR of 2.2 gm./24 hrs./100 sq. in. and a G.E. brightness of 83 when dried at 160°C. for 20 seconds.

Substantially the same results are obtained when the polyvinyl alcohol thickener is eliminated or substituted with a 2% aqueous solution of methylcellulose ("Methocel" 65 HG-DG 4000).

EXAMPLE 4

Example 3 was repeated except a 60% neutralized copolymer of ethylene and methacrylic acid (85/15%) dispersion (21% solids) was substituted for the 30% neutralized ethylene/methacrylic acid copolymer dispersion described in Example 1. The resulting pigmented dispersion when coated on cylinder board and dried at 130°C. for 20 seconds gave a coating with a Honeywell MVTR of 3.6 gm./24 hrs./100 sq. in. and a G.E. brightness of 83.

EXAMPLE 5

A 50% solids dispersion of an ethylene/vinyl acetate copolymer (28% vinyl acetate) and a 50% solids dispersion containing 60% "Aristowax" 143/150 and 40% of an ethylene/vinyl acetate copolymer (28% vinyl acetate) were substituted in Example 3 for the 30% neutralized ethylene/methacrylic acid copolymer dispersion described in Example 1. The resulting dispersions were both at 58.4% solids and both contained about 50% pigment of the composition of Example 3 and 50% binder. The binders comprised, respectively, about 78% of an ethylene/vinyl acetate copolymer (28% vinyl acetate) and about 22% "Aristowax" 143/150 and about 25% of an ethylene/vinyl acetate copolymer (28% vinyl acetate) and about 75% "Aristowax" 143/150. When dried at 150°C. for 20 seconds, these coatings on cylinder board possessed a Honeywell MVTR of 3.6 gm./24 hrs./100 sq. in. and 2.8 gm./24 hrs./100 sq. in., respectively and a G.E. brightness of 80 to 83.

EXAMPLE 6

By the procedure of Example 1, 46.5 gm. and 15.5 gm. of 70% solids dispersions of titanium dioxide and "Ultrawhite" 90 clay, respectively, were added to 100 gm. of a 42% solids dispersion comprised of 85% of a 30% neutralized copolymer of ethylene and methacrylic acid (89/11) and 15% of a 50/50 styrene butadiene copolymer ("Pliolite" 5300). "Pliolite" 5300 is fully described in trade publication *Tech. Book Facts — Latex*, Chemical Division of The Goodyear Tire & Rubber Company, published in November, 1964. Cylinder board coated and then dried at 190°C. for 30 seconds gave a coating with a Honeywell MVTR of 6.4 gm./24 hrs./100 sq. in. and a G.E. brightness of 80–83.

EXAMPLES 7 THROUGH 11

Following the procedure of Example 1, 28.0 gm. of a 50% solids dispersion of 85% "Aristowax" 143/150 and 15% of an ethylene/vinyl acetate copolymer (28% vinyl acetate) and 102 gm. of 42% solids dispersions of ethylene/methacrylic acid (89/11) copolymer, 30% neutralized with sodium hydroxide were blended with an equivalent amount, based on polymer solids, of pigment varying from 0 to 100% $TiO_2$ in 25% increments with the remaining portion of the pigment being "Ultrawhite" 90 clay. The viscosities of these dispersions were raised to approximately 250 cps using a 4% aqueous solution of polyvinyl alcohol (99% hydrolyzed). The resulting dispersions were coated on polyvinyl alcohol sized cylinder board by means of a No. 24 wire-wound bar at a coating weight of 15 to 20 lbs./3,000 ft.[2]. The G.E. brightness of the coatings varied from 29.3 to 82.2, depending upon the ratio of $TiO_2$ to "Ultrawhite" 90 clay. Independent of the nature of the pigment employed, these coatings still possessed moisture vapor barriers between 1.6 to 7.2 gm./100 in.[2]/24 hrs. when dried at 170°C. for 20 seconds. The formulations and results are shown in Table I.

TABLE I

PIGMENTED ETHYLENE COPOLYMER DISPERSIONS

| | Polymeric Binder Composition | | | | | | | Pigment composition | | | | |
|---|---|---|---|---|---|---|---|---|---|---|---|---|
| Example No. | E/MAA* (89/11) 30% Neut. | Weight % | E/VA** (72/28) | Weight % | Wax | Weight % | % Solids | $TiO_2$ Weight % | U.W.90 Clay Weight % | Viscosity cps (60 rpm) | G.E. Brightness | Honeywell MVTR |
| | Uncoated Cylinder Board | — | — | — | — | — | — | — | — | — | 29.0 | 23.0 |
| Control | " | 50.0 | — | — | — | — | — | 50.0 | — | 113 | 80.5 | 16.0 |
| 7 | " | 37.7 | " | 1.8 | " | 10.5 | 54 | 50.0 | — | 250 | 82.2 | 7.2 |

TABLE I -Continued

PIGMENTED ETHYLENE COPOLYMER DISPERSIONS

| Example No. | Polymeric Binder Composition ||||||  | Pigment composition || Viscosity cps (60 rpm) | G.E. Bright-ness | Honeywell MVTR |
|---|---|---|---|---|---|---|---|---|---|---|---|---|
|  | E/MAA* (89/11) 30% Neut. | Weight % | E/VA** (72/28) | Weight % | Wax | Weight % | % Solids | TiO₂ Weight % | U.W.90 Clay Weight % |  |  |  |
| 8  | '' | 37.7 | '' | 1.8 | '' | 10.5 | 54 | 37.5 | 12.5 | 235 | 80.1 | 3.0 |
| 9  | '' | 37.7 | '' | 1.8 | '' | 10.5 | 54 | 25.0 | 25.0 | 230 | 75.8 | 2.8 |
| 10 | '' | 37.7 | '' | 1.8 | '' | 10.5 | 54 | 12.5 | 37.5 | 245 | 66.1 | 1.6 |
| 11 | '' | 37.7 | '' | 1.8 | '' | 10.5 | 54 | —    | 50.0 | 245 | 29.3 | 2.2 |

*Ethylene/methacrylic acid copolymer
**Ethylene/vinyl acetate copolymer

TABLE II

VARIATION IN PIGMENT TO BINDER RATIO

| Example No. | Polymeric Binder Composition ||||||  | U.W.90 Clay Weight % | "Methocel" 65-HG | Vis-cosity cps (60 rpm) | G.E. Bright-ness | Honey-well MVTR |
|---|---|---|---|---|---|---|---|---|---|---|---|---|
|  | E/MAA* (89/11) 30% Neut. | Weight % | E/VA** (72/28) | Weight % | Wax | Weight % | % Solids |  |  |  |  |  |
| 12 | '' | 12.0 | '' | 1.00  | '' | 7.00  | 63.0 | 80 | No.    | 263 | 74.7 | 5.8 |
| 13 | '' | 45.0 | '' | 5.00  | '' | 25.00 | 49.0 | 25 | Yes    | 160 | 59.8 | 1.0 |
| 14 | —  | —   | '' | 10.00 | '' | 15.00 | 64.0 | 75 | No     | 125 | 59.2 | 3.8 |
| 15 | '' | 12.5 | '' | 9.50  | '' | 3.00  | 62.0 | 75 | Yes    | 360 | 73.4 | 5.4 |
| 16 | —  | —   | '' | 12.00 | '' | 13.00 | 64.0 | 75 | No     | 180 | 58.5 | 2.2 |
| 17 | —  | —   | '' | 30.00 | '' | 45.00 | 54.0 | 25 | Yes    | 150 | 58.4 | 1.6 |
| 18 | '' | 37.5 | '' | 5.50  | '' | 32.00 | 50.0 | 25 | Yes    | 158 | 57.1 | 4.8 |
| 19 | —  | —   | '' | 37.50 | '' | 37.50 | 54.0 | 25 | Yes    | 160 | 59.2 | 1.6 |
| 20 | '' | 50.0 | '' | 3.75  | '' | 21.25 | 49.0 | 25 | Yes    | 265 | 60.5 | 1.6 |
| 21 | '' | 55.0 | '' | 3.00  | '' | 17.00 | 48.5 | 25 | Yes    | 300 | 59.5 | 3.4 |
| 22 | '' | 40.0 | '' | 1.50  | '' | 8.50  | 53.6 | 50 | Yes    | 250 | 60.0 | 2.2 |
| 23 | '' | 30.0 | '' | 3.00  | '' | 17.00 | 54.7 | 50 | Yes    | 220 | 60.0 | 2.2 |
| 24 | '' | 20.0 | '' | 4.50  | '' | 25.50 | 55.8 | 50 | Yes    | 285 | 58.0 | 2.9 |
| 25 | '' | 45.0 | '' | 4.50  | '' | 25.50 | 49.4 | 25 | PVA*** | 250 | 60.5 | 1.9 |
| Control | '' | 60.0 | '' | 6.00  | '' | 34.00 | 45.0 | —  | Yes | 162 | 58.4 | 1.4 |
| Control | —  | —   | '' | 49.00 | '' | 51.00 | 50.0 | —  | Yes | 158 | 57.2 | 1.9 |

*Ethylene/methacrylic acid copolymer
**Ethylene/vinyl acetate copolymer
***Polyvinyl alcohol (99% hydrolyzed)

EXAMPLES 12 TO 25

Using the procedure of Example 1, various pigment binders were used with a 70% solids dispersion of "Ultrawhite" 90 at varying pigment-to-binder ratios. In all examples except 12, 14, 16 and 25 enough methylcellulose ("Methocel" 65-HG) or polyvinyl alcohol for Example 25 was added to raise the viscosity. The resulting dispersions were applied to polyvinyl alcohol sized cylinder board by means of a No. 24 wire-wound bar at a coating weight of 15-20 lbs./3,000 ft.² and then dried at 170°C. for 20 seconds in a forced air oven. Coatings were tested for G.E. brightness and Honeywell MVTR. The formulations and results are shown in Table II.

What is claimed is:

1. An aqueous dispersion comprising: about 50% by weight, based on the weight of solids, of a pigment mixture of about 20 to 35% by weight, based on the total weight of pigment mixture, of clay and about 65 to 80% by weight, based on the total weight of pigment mixture, of titanium dioxide; about 50% by weight, based on the weight of solids, of a polymeric pigment binder comprising about 80 to 99% by weight, based on the total weight of polymeric binder, of an ethylene copolymer of about 85 to 97% by weight ethylene and about 15 to 3% by weight of methacrylic acid, about 3 to 75% of the acid groups neutralized and about 1 to 20% by weight, based on the total weight of polymeric binder, of a hydrocarbon wax having a melting point of about 143° to 150°F., said dispersion having a solids content of about 30 to 65% by weight.

2. A coated article comprising: a substrate of pigmented cylinder board and a pigmented, moisture-barrier coating on at least one surface thereof comprising about 50% by weight of a pigment mixture of about 20–35% by weight, based on the total weight of pigment mixture, of clay and about 65–80% by weight, based on the total weight of pigment mixture, of TiO₂ and about 50% by weight of a polymeric pigment binder comprising about 80 to 99% by weight, based on the total weight of the polymeric binder, of an ethylene copolymer of about 85 to 97% by weight ethylene and about 15 to 3% by weight of methacrylic acid, about 3 to 75% of the acid groups neutralized and about 1 to 20% by weight, based on the total weight of the polymeric binder, of a hydrocarbon wax having a melting point of about 143° to 150°F.

* * * * *